No. 674,743.  
S. C. SCHOFIELD.  
SICKLE GRINDER.  
(Application filed Aug. 22, 1900.)  
Patented May 21, 1901.
(No Model.)
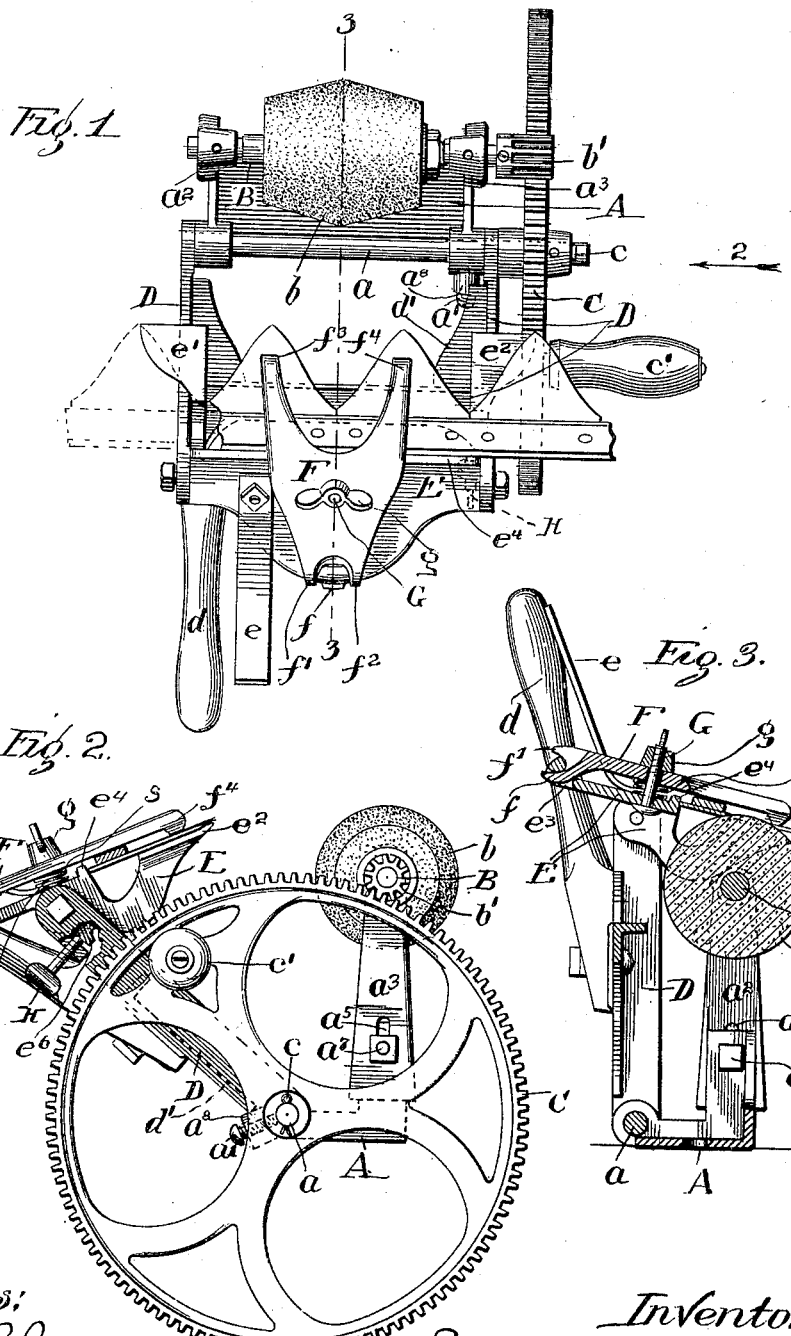
Witnesses:
Chas. O. Shervey
S. Bliss.
Inventor:
Silas C. Schofield
by Miles Gorman & Bitner
Attys.
THE NORRIS PETERS CO., PHOTO-LITHO., WASHINGTON, D. C.

UNITED STATES PATENT OFFICE.

SILAS C. SCHOFIELD, OF FREEPORT, ILLINOIS.

SICKLE-GRINDER.

SPECIFICATION forming part of Letters Patent No. 674,743, dated May 21, 1901.

Application filed August 22, 1900. Serial No. 27,712. (No model.)

*To all whom it may concern:*

Be it known that I, SILAS C. SCHOFIELD, a citizen of the United States of America, residing at Freeport, in the county of Stephenson and State of Illinois, have invented certain new and useful Improvements in Sickle-Grinders, of which the following is a specification.

My invention relates to certain improvements in sickle-grinders, the purpose of which is to provide means for conveniently and accurately handling, guiding, and pressing the sickle upon the stone, together with stable and effective means for clamping the sickle in the holding devices.

To such end the invention consists in certain novel characteristics, which will be described in connection with the complete mechanism set forth below, and the essential features of which will be definitely pointed out in the appended claims.

In the drawings illustrating the invention, Figure 1 is a plan of the same with the sickle-holder thrown back away from the stone. Fig. 2 is an end elevation looking from the arrow 2 in Fig. 1; and Fig. 3 is a vertical transverse section in line 3 3 of Fig. 1, showing the sickle-holder, however, thrown forward to bring the base of the knives upon the middle portion of the stone.

Referring to the drawings, A is a framework adapted for attachment to a stationary object, said framework having in its lower portion a stationary shaft $a$, fastened by a set-screw $a'$, threaded in a boss $a^8$ upon said lower portion and engaging the shaft. Extending upward from said portion are a pair of standards $a^2$ $a^3$, secured to the base by means of slots $a^4$ $a^5$ and bolts $a^6$ $a^7$. In the tops of these standards is journaled a shaft B, carrying a grinding-wheel $b$, largest at its middle portion and tapering toward both ends in the manner of the ordinary sickle-grinding stone. The shaft B also carries a pinion $b'$, in mesh with a spur-gear C, secured upon the end of the shaft $a$ by a pin $c$ and provided with a handle $c'$ for rotating it to drive the grinding-wheel.

Upon the shaft $a$ is pivoted a swinging frame D, provided with a handle $d$, and a sickle-holder E is pivoted to the free end of the swinging frame and provided with a handle $e$ near to the handle $d$, so that the two may be manipulated by one hand of the operator while the other hand is engaged in driving the grinding-wheel. The sickle-holder is provided with two arms $e'$ $e^2$, upon which the knives of the sickle rest, and upon the opposite side of its pivot with an eye $e^3$, in which is pivoted a clamp F by means of a single lower tongue $f$, passing through the eye and two upper tongues $f'$ $f^2$, resting upon the top of the same. A bolt G and wing-nut $g$ force the clamp downward, and two projecting fingers $f^3$ $f^4$ bear upon knives which are above the stone to hold the same firmly against the action of the latter. A spring $s$ encircles the bolt G and yieldingly holds the fingers $f^3$ $f^4$ away from the sickle when permitted to do so by the unscrewing of the wing-nut $g$. A guiding-rib $e^4$ furnishes a rest for the back of the sickle, as is seen in the drawings. An adjusting-screw H, threaded in the swinging frame, bears upon a shoulder $e^6$ upon the sickle-holder to limit the movement of the latter toward the stone, so that there may be no danger of allowing the sickle to drop downward too far as it approaches the face of the stone. The boss $a^8$ forms a stop limiting the backward movement of the frame D, said frame having a rib $d'$, which engages the boss.

The movement of the sickle toward or from the stone is controlled by the handle $d$, and the pressure of the sickle upon the stone is governed by the handle $e$, both of which may be easily manipulated by the left hand, the handle $d$ resting in the bottom of the hand and the handle $e$ being operated by the ends of the thumb and fingers.

The invention is not limited to the particular mechanism shown and described, inasmuch as the same may be varied in a great many particulars without departing from the essential features thereof.

I claim as new and desire to secure by Letters Patent—

1. The combination, in an article of the class described, of a main frame and grinding-wheel, a swinging frame pivoted upon an axis removed from that of the grinding-wheel, a holder pivoted to the swinging frame and handles upon the holder and swinging frame respectively, arranged near together and adapted to be manipulated by the same hand; substantially as described.

2. In an article of the class described, the combination with a main frame and grinding-wheel, of a swinging frame pivoted upon an axis removed from that of the grinding-wheel, a holder pivoted to the swinging frame and an adjustable stop adapted to limit the movement of the holder toward the wheel; substantially as described.

3. In an article of the class described, the combination with a main frame and grinding-wheel, of a swinging frame pivoted to the main frame, out of the grinding-wheel axis, a holder, E, pivoted to the swinging frame and having the arms, $e'$, $e^2$, the eye, $e^3$, and the guiding-rib, $e^4$, and a clamp, F, pivoted in the eye and provided with the fingers, $f^3$, $f^4$, and also the clamping bolt and nut, G, $g$; substantially as described.

In witness whereof I have hereunto set my hand, at Chicago, in the county of Cook and State of Illinois, this 10th day of August, A. D. 1900.

SILAS C. SCHOFIELD.

Witnesses:
CHAS. O. SHERVEY,
S. BLISS.